P. A. TOURTIER.
WHEEL.
APPLICATION FILED AUG. 22, 1918.

1,329,213. Patented Jan. 27, 1920.

UNITED STATES PATENT OFFICE.

PAUL AUGUSTE TOURTIER, OF NEW ORLEANS, LOUISIANA.

WHEEL.

1,329,213.  Specification of Letters Patent.  Patented Jan. 27, 1920.

Application filed August 22, 1918. Serial No. 250,984.

*To all whom it may concern:*

Be it known that I, PAUL AUGUSTE TOURTIER, a citizen of France, and a resident of New Orleans, in the parish of Orleans and State of Louisiana, have invented certain new and useful Improvements in Wheels, of which the following is a specification.

My present invention relates generally to wheels and more particularly to pneumatic wheels which will include all of the tractive properties and ease in riding of the pneumatic tire and still remain puncture proof. In fact, my invention aims to retain all of the advantages of the usual pneumatic tire and at the same time eliminate its disadvantages.

My invention has to do with a wheel including a plurality of radially movable pistons, each under air pressure so as to effectively cushion its inward movement, and each carrying its respective section of a sectional tread or periphery, the latter being either plain or of non-skid structure, and the hub of the wheel being hollow to form a compressed air chamber with which the several piston chambers are in communication.

My invention further aims to provide certain details of construction through the use of which a practical efficient wheel of the above type may be promoted and placed in use, and with the foregoing in mind, my invention, in its most specific aspect, resides in the following construction, arrangement and operation of parts, reference being made to the accompanying drawing forming a part of the specification, and in which—

Figure 1 is a side view, partly broken away and in section, of a wheel constructed in accordance with my invention;

Fig. 2 is a sectional view taken therethrough substantially on line 2—2 of Fig. 1; and Fig. 3 is an enlarged radial section taken substantially on line 3—3 of Fig. 1.

Referring now to these figures, my invention proposes a wheel having a hollow, cast and internally reinforced hub 20 whose axle or shaft receiving opening appears at 21 and whose hollow chamber 22 is adapted to receive compressed air through any suitable air valve 23. Reinforcing ribs A are arranged in the chamber 22, and upon the outer face of the hub is a plate B secured to the hub in any suitable manner. This hub 20 is furthermore cast with a plurality of radially disposed cylindrical extensions 24, open at their outer ends and forming piston cylinders for the reception of pistons 25.

Each piston 25 has a limited movement in its respective cylinder by virtue of a transversely disposed bolt 26 which is extended through diametrically opposed openings of the cylinder and through lengthwise opposed slots 27 of the piston, at the ends of the latter of which are disposed elastic bumpers 28.

Each piston 25 has threaded to its outer end the tubular extension 29 of its respective tread section 30, and each of these sections is movable independent of the other section and without contact therewith. The connection between each piston 25 and its tread section 30 is locked by a bolt 31 through the tubular extension 29, as seen in Fig. 3, and bolts 32 may be utilized through each section, and its tire 33 which fits flatwise against the outer surface thereof, not only to supplement the holding action of flanges 34 of the rim section, but to provide for non-skid arrangement, the bolts 32 having outer conical heads 35 beyond the tire 33.

At its inner end, each piston 25 has soft leather and oiled washers 36, in addition to which each piston has an annular groove 37 between its inner end and its slots 27 within which is located an annular pneumatic tube 38 whose periphery engages the wall of the cylinder 24 and is encircled by an oiled strip 39. Each cylinder has oil openings 40, whereby the pistons and their parts may be thoroughly lubricated at all times. Each pneumatic tube 38 has an inflating valve 42 and is thus adapted to coöperate with the washers 36 in effectively preventing leakage of air from the air chamber 22. Within each piston is a spring pressed stop C for limiting the movement of the same in the cylinder in case of a leaky valve.

It is obvious that, moving independently of one another, as they do, the several pistons and their wheel tread sections are capable of independent adjustment, repair and control and are readily accessible for these purposes, as well as for substitution of parts.

I am thus enabled to effectively and efficiently carry out the objects first above stated and provide a practical operative structure.

I claim as my invention:

1. A wheel having a hollow hub and a plurality of radial piston cylinders, said cylinders having uniform bores throughout, and having their outer ends disconnected, a plurality of pistons working in said cylinders subject to air pressure within the hollow hub, said pistons having tubular outer ends projecting beyond the outer ends of the cylinders, a tread in a plurality of independent sections, each section rigidly secured to a piston, and means for limiting movement of said pistons.

2. A wheel having a hollow hub and a plurality of radial piston cylinders, a plurality of pistons working in said cylinders subject to air pressure within the hollow hub, a tread in a plurality of sections, each section carried by one of said pistons, each piston having an annular groove within its cylinder, and a pneumatic tube located in said groove and engaging the cylinder.

3. A wheel having a hollow hub forming an air chamber, piston cylinders extending radially from said hub and in communication with said chamber, pistons slidable in said cylinders and having tubular outer ends, and held against rotation, and a plurality of independent tread sections, each having a tubular extension in which the end of a piston is secured.

4. A wheel having a hollow hub forming an air chamber, piston cylinders extending radially from said hub and in communication with said chamber, pistons slidable in said cylinders, and held against rotation, and a tread in sections detachably connected to the pistons to move independently of one another with the pistons, each of said pistons having washers and a pneumatic piston ring engaging the wall of its cylinder.

5. A wheel having a hollow hub forming an air chamber, piston cylinders extending radially from said hub and in communication with said chamber, pistons slidable in said cylinders and held against rotation, a tread in sections detachably connected to the pistons to move independently of one another with the pistons, each cylinder having opposing openings and each piston having opposing lengthwise slots, a bolt extending through the cylinder openings and through the slots of the piston, and bumpers carried by the piston at the ends of the slots.

6. A wheel comprising a hollow hub and a plurality of radial cylinders, a tread in sections, a plurality of pistons each carrying one of said tread sections and movable in one of said cylinders, each piston having an annular groove, a pneumatic tube in the groove and an oiled ring encircling the tube and forced thereby into contact with the cylinder wall.

PAUL AUGUSTE TOURTIER.